(12) United States Patent
Suzuki

(10) Patent No.: US 10,880,626 B2
(45) Date of Patent: Dec. 29, 2020

(54) CONNECTOR DEVICE AND TRANSMISSION CABLE

(71) Applicant: KABUSHIKI KAISHA TOSHIBA, Minato-ku (JP)

(72) Inventor: Nobuaki Suzuki, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/553,875

(22) Filed: Aug. 28, 2019

(65) Prior Publication Data

US 2020/0092621 A1 Mar. 19, 2020

(30) Foreign Application Priority Data

Sep. 14, 2018 (JP) .................. 2018-172637

(51) Int. Cl.
*H01R 13/66* (2006.01)
*H04B 10/80* (2013.01)
*G02B 6/42* (2006.01)
*H04B 10/25* (2013.01)
*H04Q 11/00* (2006.01)

(52) U.S. Cl.
CPC ....... *H04Q 11/0005* (2013.01); *G02B 6/4284* (2013.01); *H01R 13/66* (2013.01); *H04B 10/25891* (2020.05); *H04B 10/806* (2013.01); *H04Q 2011/0037* (2013.01)

(58) Field of Classification Search
CPC ............ H04B 10/25891; H04B 10/806; H04B 10/808
See application file for complete search history.

(56) References Cited

U.S. PATENT DOCUMENTS

| 2014/0120750 A1* | 5/2014 | Johnson | ................. H01R 27/00 439/131 |
| 2017/0141516 A1* | 5/2017 | Chen | ..................... H01R 13/64 |

FOREIGN PATENT DOCUMENTS

| JP | 2005-167867 A | 6/2005 |
| JP | 2012-124808 A | 6/2012 |

* cited by examiner

*Primary Examiner* — Omar R Rojas
(74) *Attorney, Agent, or Firm* — Oblon, McClelland, Maier & Neustadt, L.L.P.

(57) ABSTRACT

According to an embodiment, a connector device is connected to an electronic device. The connector device includes a signal processor, a switch, and a movable member. The signal processor processes a signal inputted from the electronic device or a signal outputted to the electronic device. The switch is ON when power supplied from the electronic device is used as a power supply for operating the signal processor. The movable member moves to a first position when the switch is ON and moves to a second position when the switch is OFF. The connector device is connectable to a power-supply-support electronic device and is not connectable to a power-supply-non-support electronic device when the movable member is at the first position. The connector device is connectable to the power-supply-support and power-supply-non-support electronic devices when the movable member is at the second position.

4 Claims, 6 Drawing Sheets

CONNECTOR DEVICE AND TRANSMISSION CABLE

CROSS-REFERENCE TO RELATED APPLICATIONS

This application is based upon and claims the benefit of priority from Japanese Patent Application No. 2018-172637, filed on Sep. 14, 2018; the entire contents of which are incorporated herein by reference.

FIELD

Embodiments described herein relate generally to a connector device and a transmission cable.

BACKGROUND

As one example of an interface which transmits a digital video signal without compression, High-Definition Multimedia Interface (HDMI) (registered trademark) is known. In recent years, to enable stable transmission of a high-definition video signal such as 8K, an HDMI Active Optical Cable (AOC) which uses an optical fiber as a channel has been developed as an HDMI cable which conforms to HDMI standards.

The HDMI active optical cable needs power for converting an electrical signal into an optical signal and transmitting the optical signal. This power is greater than power conventionally used by general HDMI cables. Hence, to stably transmit a high-definition video signal by using the HDMI active optical cable, it is necessary to supply power to the HDMI active optical cable. In view of this background, it has been considered to provide a function of supplying power to the HDMI active optical cable, to an electronic device to which the HDMI active optical cable is connected.

However, in a situation where power supply support electronic devices for HDMI active optical cables and power supply non-support electronic devices exist in a mixed manner, the HDMI active optical cable is connected to a power supply non-support electronic device by mistake in some cases. In such a case, the HDMI active optical cable requests more power than anticipated to the power supply non-support electronic device, thereby causing an erroneous operation of the electronic device.

Patent Literature 1: Japanese Patent Application Laid-Open No. 2005-167867

Patent Literature Japanese Patent Application Laid-Open No. 2012-124808

DETAILED DESCRIPTION

According to an embodiment, a connector device is connected to an electronic device. The connector device includes a signal processor, a switch, and a movable member. The signal processor processes a signal inputted from the electronic device or a signal outputted to the electronic device. The switch ON when power supplied from the electronic device is used as a power supply for operating the signal processor. The movable member moves to a first position when the switch is ON and moves to a second position when the switch is OFF. The connector device is connectable to a power-supply-support electronic device and is not connectable to a power-supply-non-support electronic device when the movable member is at the first position. The connector device is connectable to the power-supply-support and power-supply-non-support electronic devices when the movable member is at the second position.

Hereinafter, a connector device and a transmission cable according to embodiments will be described in detail with reference to the accompanying drawings.

Figure 1:
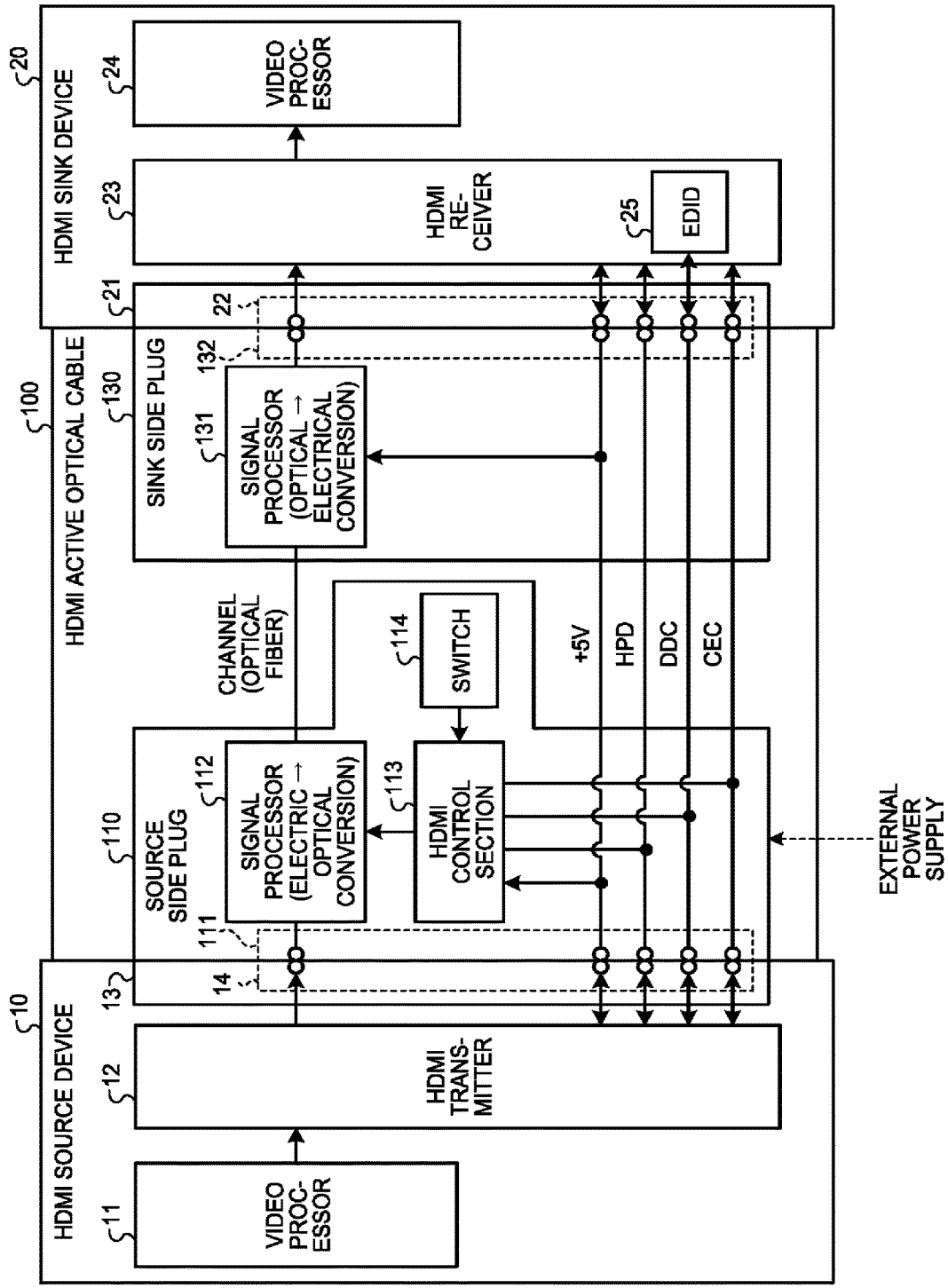
FIG. 1 is a block diagram illustrating one example of an HDMI video transmission system.

FIG. 1 is a block diagram illustrating one example of an HDMI video transmission system to which a connector device and a transmission cable according to the embodiment are applied. This HDMI video transmission system employs a configuration where an HDMI source device 10 which is an electronic device on a side which transmits a video signal, and an HDMI sink device 20 which is an electronic device on a side which receives the video signal are connected via an HDMI active optical cable 100. The HDMI source device 10 is, for example, an optical disk player, a set-top box, a video camera, a personal computer, or a smartphone. The HDMI sink device 20 is, for example, a television receiver, a display, a projector, a personal computer, or a smartphone.

The HDMI source device 10 and the HDMI sink device 20 are provided with HDMI receptacles 13 and 21, respectively. When a source side plug 110 of the HDMI active optical cable 100 is attached to the receptacle 13 provided in the HDMI source device 10, and the source side plug 110 of the HDMI active optical cable 100 is attached to the receptacle 21 provided in the HDMI sink device 20, the HDMI source device 10 and the HDMI sink device 20 are connected so as to enable transmitting a video signal (including an audio signal) via the HDMI active optical cable 100. In the present embodiment, the HDMI active optical cable 100 corresponds to a "transmission cable" recited in the claims, and the source side plug 110 of the HDMI active optical cable 100 corresponds to a "connector device" recited in the claims.

A video signal is transmitted from the HDMI source device 10 to the HDMI sink device 20 by using a channel (optical fiber) of the HDMI active optical cable 100 by a Transition Minimized Differential Signaling (TMDS) method including four lanes of TMDS ch1, TMDS ch2, TMDS ch3 and TMDS CLK. That is, the HDMI source device 10 transmits video data in a non-compressed state by using three channels of TMDS ch1, TMDS ch2 and TMDS ch3, and transmits a pixel clock synchronized with the video data by using TMDS CLK. The HDMI sink device 20 receives the video signal transmitted by using the three channels of TMDS ch1, TMDS ch2 and TMDS ch3 in synchronization with the pixel clock transmitted by using TMDS CLK.

In addition, the video signal can be transmitted from the HDMI source device 10 to the HDMI sink device 20 by a transmission method which is called Fixed Rate Link (FRL). In case of the FRL method, a clock frequency is fixed unlike a IMPS method. The FRL method can transmit larger-volume data than that of the TMDS method.

Furthermore, in addition to channels of these four lanes, the HDMI active optical cable 100 includes a Hot-Plug-Detect (HPD) line, a Display Data Channel (DDC) line, a Consumer Electronics Control (CEC) line and a +5V line as lines which connect the HDMI source device 10 and the HDMI sink device 20.

The HPD line is used by the HDMI source device 10 to, for example, detect connection of the HDMI sink device 20. The DDC line is used by the HDMI source device 10 to, for example, recognize capability of the HDMI sink device 20. The CEC line is used to, for example, transmit a control command between the HDMI source device 10 and the HDMI sink device 20.

The +5V line is a power supply line through which a current (at least 55) needed for reading Extended Display Identification Data (EDID) of the HDMI sink device 20 flows. In the present embodiment, when the HDMI source device 10 supplies power which is a power supply with respect to the HDMI active optical cable 100, for example, this +5V line can be used. In addition, in case that a sufficient current that meets power required by the HDMI active optical cable 100 cannot be fed to the +5V line, another power supply line can be provided in addition to the +5V line.

Furthermore, one of the HPD line, the DDC line, the CEO line, and the +5V line (e.g., DDC line) is used as described below by the power supply support HDMI source device 10 for the HDMI active optical cable 100 to authenticate the HDMI active optical cable 100. In addition, to distinguish between the power supply support HDMI source device 10 and the power supply non-support HDMI source device 10 in the following description, the former is assigned reference numeral 10A, and the latter is assigned reference numeral 10B.

The HDMI source device 10 includes a video processor 11 and an HDMI transmitter 12. When, for example, detecting connection of the HDMI sink device 20 by using the HPD line, the HDMI source device 10 reads EDID of the HDMI sink device 20 by using the DDC line, and decides a recommended resolution of the HDMI sink device 20 based on this EDID. Furthermore, the video processor 11 converts a format of the video signal to be transmitted to the HDMI sink device 20 into a format matching the recommended resolution of the HDMI sink device 20, and the HDMI transmitter 12 transmits this video signal by the above TMDS method.

The HDMI sink device 20 includes an HDMI receiver 23 and a video processor 24. The HDMI receiver 23 is provided with an EDID memory 25 which stores the EDID of the HDMI sink device 20. When the HUM rce device 10 transmits the video signal by the TDMS method, the HDMI receiver 23 of the HDMI sink device 20 receives this video signal. Furthermore, the video processor 24 performs processing of displaying video image on a display based on the received video signal. In addition, the HDMI source device 10 and the HDMI sink device 20 can communicate each other for such as transmission and reception of a control command by using the CEC line.

The HDMI active optical cable 100 which transmits the video signal transmitted from the HDMI source device 10 to the HDMI sink device 20 includes a source side plug 110 which is attached to the receptacle 13 of the HDMI source device 10, and a sink side plug 130 which is attached to the receptacle 21 of the HDMI sink device 20.

The source side plug 110 includes a terminal 111, a signal processor 112, an HDMI control section 113 and a switch 114. The terminal 111 comes into contact with a terminal 14 of the receptacle 13 when the source side plug 110 is attached to the receptacle 13 of the HDMI source device 10. Thus, the source side plug 110 is electrically connected to the HDMI source device 10.

To transmit the video signal transmitted by the HDMI source device 10 to the HDMI sink device 20 by using a channel made of an optical fiber, the signal processor 112 converts the video signal inputted from the HDMI source device 10 via the terminal 111 from an electrical signal into an optical signal by using a laser oscillator. A power supply for operating this signal processor 112 can use power supplied from this HDMI source device 10A as long as the HDMI source device 10 is the power supply support HDMI source device 10A. That is, when authenticating that the connected transmission cable is the HDMI active optical cable 100, the HDMI source device 10A becomes in a state enabling power to be supplied to this HDMI active optical cable 100. The HDMI control section 113 obtains power from the HDMI source device 10A by using the +5V line, and can supply the power to the signal processor 112.

Furthermore, as long as the source side plug 110 is connected to the external power supply which performs, for example, Universal Serial Bus (USB) power feeding, the external power supply can supply power which is necessary to operate the signal processor 112.

When the source side plug 110 is connected to the power supply support HDMI source device 10A, the HDMI control section 113 responds to the authentication request from power supply support HDMI source device 10A under a condition that the switch 114 is turned on. The authentication request of the HDMI source device 10A and a response of the HDMI control section 113 are performed by using, for example, the DDC line. When the HDMI control section 113 responds to the authentication request from the HDMI source device 10A, the HDMI source device 10A recognizes that the HDMI active optical cable 100 is connected, and becomes in a state enabling power to be supplied to the HDMI active optical cable 100.

When using power supplied from the HDMI source device 10 as a power supply for operating the signal processor 112, the switch 114 is turned on by operation performed by a user. When the HDMI source device 10 is the power supply support HDMI source device 10A, and the signal processor 112 is operated by using power supplied from this HDMI source device 10A, a user attaches the source side plug 110 to the receptacle 13 of the HDMI source device 10A in a state where the switch 114 is on. Whereby, the HDMI source device 10A authenticates the HDMI active optical cable 100, so that power supplied from the HDMI source device 10A can be used as a power supply for operating the signal processor 112. In addition, in the present embodiment, to prevent the HDMI active optical cable 100 from being connected to a power supply non-support HDMI source device 10B by mistake, the source side plug 110 cannot be connected to e HDMI source device 10B in a state where the switch 114 is in an on state.

On the other hand, when, for example, the source side plug 110 is connected to the external power supply, i.e., for example, when power fed from the HDMI source device 10 does not need to be used as a power supply for operating the signal processor 112, the user attaches the source side plug 110 to the receptacle 13 of the HDMI source device 10 in a state where this switch 114 is turned off. When the switch 114 is in the off state, regardless of the HDMI source device 10 being the power supply support HDMI source device 10A or the power supply non-support HDMI source device 10B, the source side plug 110 can be attached to the receptacle 13 of the HDMI source device 10. When the source side plug 110 is connected to the HDMI source device 10A in the off state of the switch 114, the HDMI control section 113 does not respond to the authentication request from the HDMI source device 10, and therefore the HDMI source device 10A does not supply power.

In addition, a case where the source side plug 110 is connected to the external power supply has been assumed as an example of a case where the source side plug 110 is connected to the HDMI source device 10 in a state where the switch 114 is turned off. However, the embodiment is not limited to this. When, for example, the HDMI active optical cable 100 includes a channel of a copper wire in addition to a channel of the optical fiber, and is configured to be switchable between active transmission which uses the channel of the optical fiber, and passive transmission which uses a channel of a copper wire, if passive transmission is performed by using the channel of the copper wire, the source side plug 110 can be connected to the HDMI source device 10 in a state where the switch 114 is turned off.

The sink side plug 130 includes a signal processor 131 and a terminal 132. The terminal 132 comes into contact with terminal 22 of the receptacle 21 when the sink side plug 130 is attached to the receptacle 21 of the HDMI sink device 20. Thus, the sink side plug 120 is electrically connected to the HDMI sink device 20.

To output the video signal transmitted by using the channel made of the optical fiber to the HDMI sink device 20 via the terminal 132, the signal processor 131 converts the optical signal into the electrical signal by using a photodetector. As a power supply for operating this signal processor 131, power supplied through a power supply line such as the +5V line can be used. That is, when the signal processor 112 of the source side plug 110 is operated by using power supplied from the power supply support HDMI source device 10A, the power supplied from the HDMI source device 10A flows in the power supply line such as the +5V line, thereby enabling operating the signal processor 131 of the sink side plug 130, too, by using this power. Furthermore, as long as the source side plug 110 is connected to the external power supply, the power from this external power supply flows in the power supply line such as the +5V line, thereby also enabling operating the signal processor 131 of the sink side plug 130 by using this power.

Figure 2:
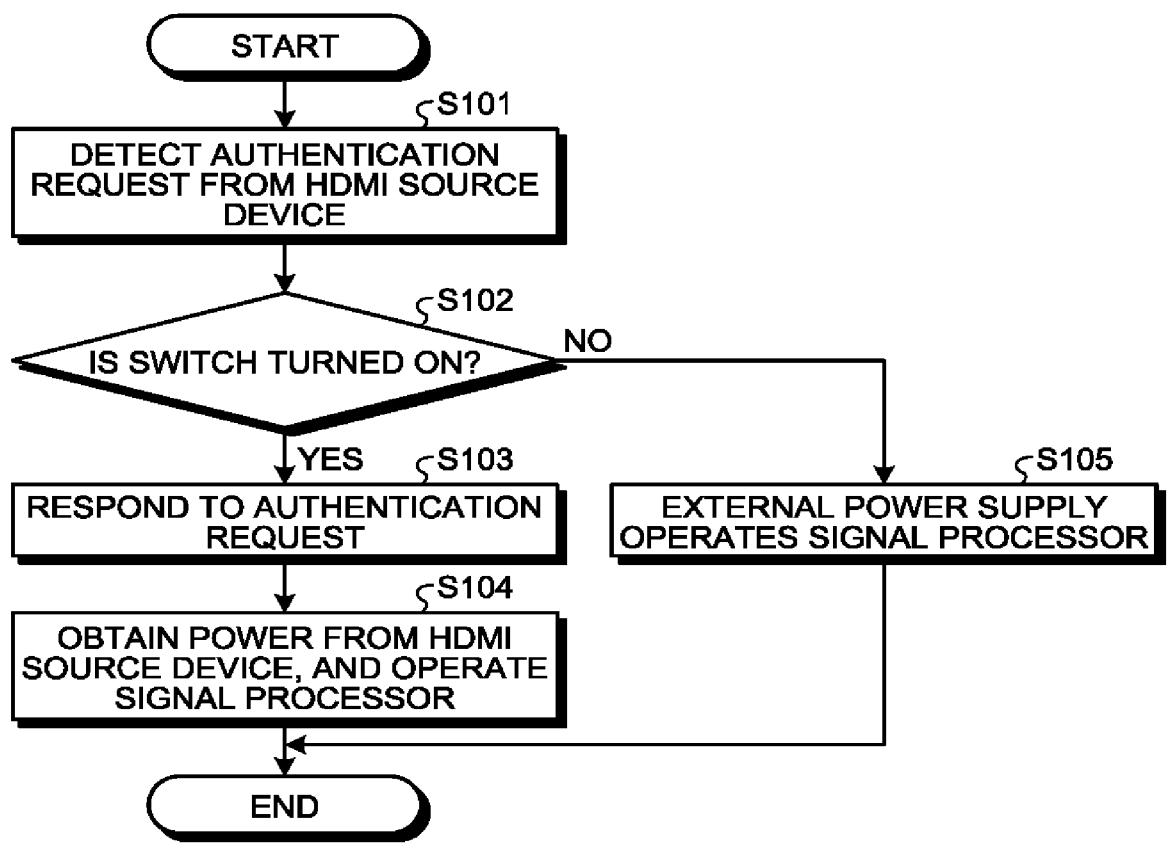
FIG. 2 is a flowchart illustrating a processing procedure of an HDMI control section in a case where an HDMI active optical cable according to an embodiment is connected to a power supply support HDMI source device.

FIG. 2 is a flowchart illustrating a processing procedure of the HDMI control section 113 in a case where the HDMI active optical cable 100 according to the present embodiment is connected to the power supply support. HDMI source device 10A.

When the HDMI active optical cable 100 is connected to the HDMI source device 10A, the HDMI source device 10A performs the authentication request for authenticating the HDMI active optical cable 100 by using, for example, the DDC line. The authentication request is not limited to the DDC line, and may be performed by using one of the HPD line, the CEC line and the +5V line. When detecting the authentication request from this HDMI source device 10A (step S101), the HDMI control section 113 checks whether or not the switch 114 provided in the source side plug 110 is turned on (step S102).

Furthermore, when the switch 114 is turned on (step S102: Yes), the HDMI control section 113 responds to the authentication request from the HDMI source device 10A (step S103). Thus, the HDMI source device 10A can supply power to the HDMI active optical cable 100. Subsequently, when transmitting the video signal from the HDMI source device 10A to the HDMI sink device 20, the HDMI control section 113 obtains power from the HDMI source device 10A, and operates the signal processors 112 and 131 (step S103).

On the other hand, when the switch 114 is in the off state (step S103: No), the HDMI control section 113 does not respond to the authentication request from the HDMI source device 10A. In this case, the HDMI source device 10A is not in a state enabling supplying power. Therefore, when the HDMI source device 10A transmits the video signal from the HDMI source device 10A to the HDMI sink device 20, power is not obtained from the HDMI source device 10A, and, for example, the external power supply operates the signal processors 112 and 131 (step 2105).

As described above, the HDMI active optical cable 100 according to the present embodiment is connected to the power supply support HDMI source device 10A in a state where the switch 114 provided with the source side plug 110 is turned on, so that it is possible to operate the signal processor 112 of the source side plug 110 and the signal processor 131 of the sink side plug 130 by using power supplied from the HDMI source device 10A. However, in a situation that there are the power supply support HDMI source device 10A and the power supply non-support HDMI source device 105 in a mixed manner, the HDMI active optical cable 100 is connected to the HDMI source device 105 by mistake, the HDMI active optical cable 100 requests more power than anticipated to the HDMI source device 10B, thereby causing an erroneous operation of the HDMI source device 108.

Hence, for the HDMI active optical cable 100 according to the present embodiment, the movable members which move in a coupled manner with the switch 114 are provided to the source side plug 110, and, in a state where this switch 114 is turned on, the source side plug 110 cannot be connected to the power supply non-support HDMI source device 10B.

Figure 3:
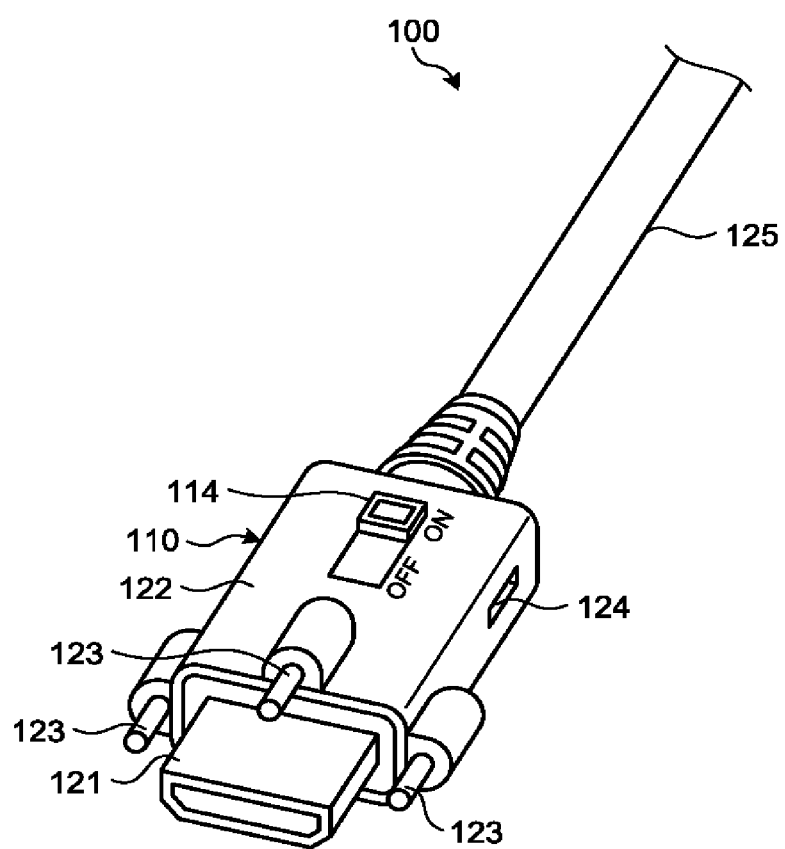
FIG. 3 is a diagram illustrating one example of the HDMI active optical cable according to the embodiment.
Figure 4:
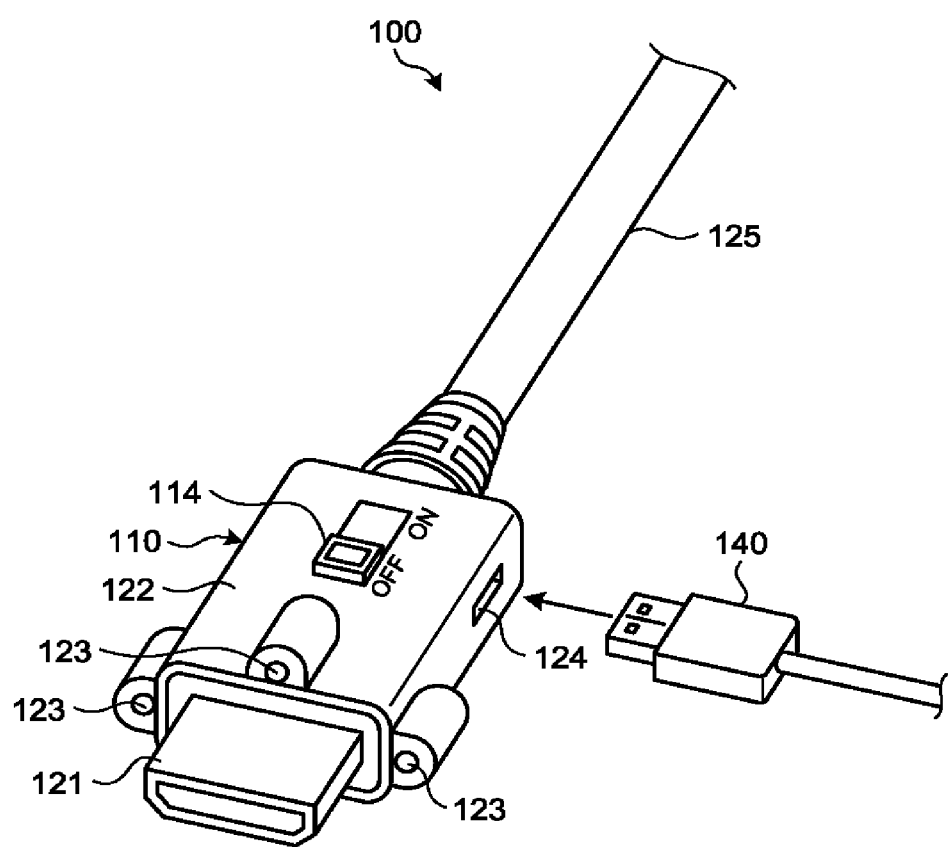
FIG. 4 is a diagram illustrating one example of the HDMI active optical cable according to the embodiment.

FIGS. 3 and 4 are diagrams illustrating one example of the HDMI active optical cable 100 according to the present embodiment. FIG. 3 illustrates an external appearance of the source side plug 110 in a state where the switch 174 is on, and FIG. 4 illustrates an appearance of the source side plug 110 in a state where the switch 114 is off.

As illustrated in FIGS. 3 and 4, the source side plug 110 is provided at an end portion of a cable main body 125, and includes a plug shell 121 and a housing 122. The plug shell 121 accommodates a pin base to which a pin which composes the above-explained terminal 111 is fixed. Furthermore, the housing 122 accommodates a laser oscillator and a control circuit which compose the above-explained signal processor 112, and a substrate on which a semiconductor chip which composes the above-explained HDMI control section 113 is mounted.

The housing 122 of the source side plug 110 is provided with the above switch 114 operably, and is provided with projections 123 which are movable members which move in a coupled manner with this switch 114. The projections 123 are made of, for example an insulation material such as a resin, and are accommodated inside the housing 122 (see FIG. 4) when the switch 114 is in the off state, and protrude from the housing 122 toward the plug shell 121 (see FIG. 3) when the switch 114 is turned on. That is, these projections 123 move to first positions at which these projections 123 protrude from the housing 122 toward the plug shell 121 when the switch 114 is turned on, and moves to second positions at which these projections 122 are accommodated inside the housing 122 when the switch 114 is turned off. By, for example, coupling the switch 114 with the projections 122 via a predetermined link mechanism, it is possible to realize the above motions of the projections 123 in a coupled manner with the operation of the switch 114.

In addition, FIGS. 3 and 4 illustrate an example where the three projections 123 are provided on a top surface and on both side surfaces of the housing 122. However, the number, positions, and the shapes of the projections 123 are not limited to this example, and can be optionally determined.

Furthermore, the housing 122 of the source side plug 110 is provided with a power supply receptacle 124 to which, for example, an external power feeding USB plug 140 (see FIG. 4) is attached. When the external power feeding USB plug 140 is attached to this power supply receptacle 124, the source side plug 110 is connected to the external power supply. Hence, in this case, as the power supply for operating the signal processor 112, it is unnecessary to use power supplied from the power supply support HDMI source device 10.

Figure 5:
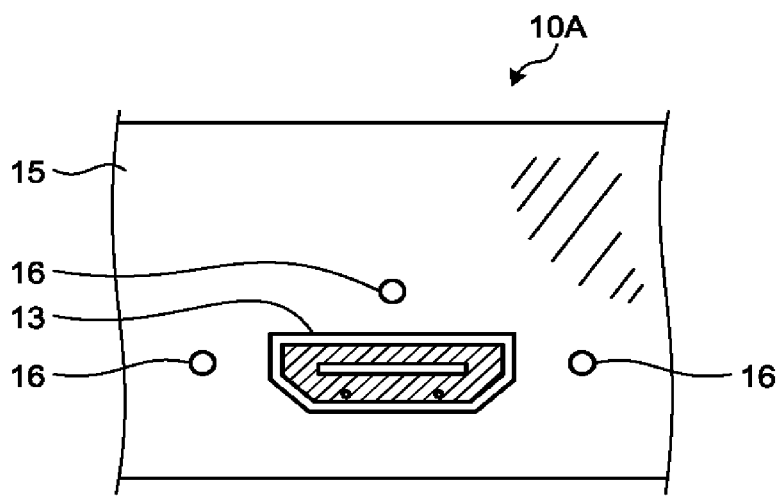
FIG. 5 is a diagram illustrating a vicinity of an HDMI receptacle of a power supply support HDMI source device.
Figure 6:
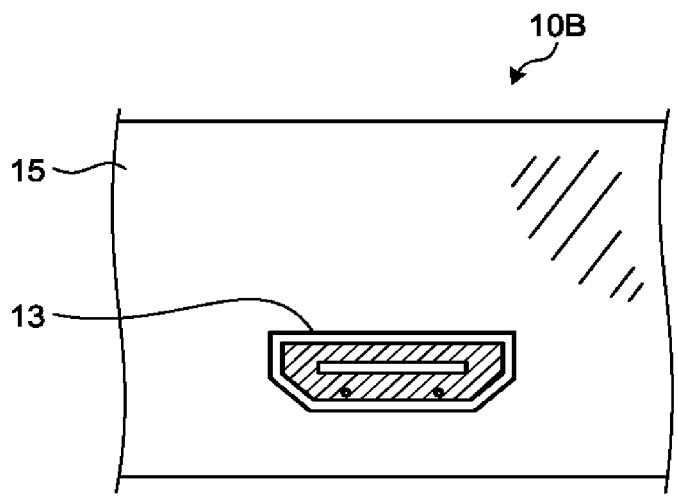
FIG. 6 is a diagram illustrating a vicinity of the HDMI receptacle of a power supply non-support HDMI source device.

FIG. 5 is a diagram illustrating the vicinity of the receptacle 13 of the power supply support HDMI source device 10A. FIG. 6 is a diagram illustrating the vicinity of the receptacle 13 of the power supply non-support HDMI source device 10B. As illustrated in FIG. 5, a housing 15 of the power supply support HDMI source device 10A is provided with recess portions 16 which can accommodate the projections 123 of the source side plug 110 when the source side plug 110 of the HDMI active optical cable 100 is attached to the receptacle 13. On the other hand, the housing 15 of the power supply non-support HDMI source device 10B is not provided with these recess portions 16 as in FIG. 6.

Hence, the source side plug 110 of the HDMI active optical cable 100 can be attached to the receptacle 13 of the power supply support HDMI source device 10A in a state where the projections 123 protrude from the housing 122 toward the plug shell 121 (first positions), but cannot be attached to the receptacle 13 of the power supply non-support HDMI source device 10B because the projections 123 interfere with the housing 15. That is, when the projections 123 are at the first positions, the source side plug 110 is connectable to the power supply support HDMI source device 10A, but is not connectable to the power supply non-support HDMI source device 10B.

On the other hand, in a state where the projections 123 are accommodated inside the housing 122 (second positions), the source side plug 110 of the HDMI active optical cable 100 can be attached to the receptacle 13 of the power supply support HDMI source device 10A, and can also be attached to the receptacle 13 of the poorer supply non-support HDMI source device 10B. That is, when the projections 123 are at the second positions, the source side plug 110 is connectable both of the power supply support HDMI source device 10A and the power supply non-support HDMI source device 10B.

When using power supplied from the HUM source device 10 as a power supply for operating the signal processors 112 and 131, the user who uses the HDMI active optical cable 100 turns on the switch 114 provided on the source side plug 110. When the switch 114 is turned on, the projections 123 provided to the source side plug 110 protrude from the housing 122 toward the plug shell 121. In this case, the HDMI active optical cable 100 is connectable to the power supply support HDMI source device 10A, but is not connectable to power supply non-support HDMI source device 10B. Hence, the HDMI active optical cable 100 is not connected to the HDMI source device 10B by mistake, so that it is possible to effectively prevent inconvenience of requesting more power than anticipated to the HDMI source device 10B, thereby causing an erroneous operation.

Furthermore, when the source side plug 110 is attached to the receptacle 13 of the HDMI source device 10A in a state where the switch 114 is turned on, the HDMI source device 10A authenticates the HDMI active optical cable 100, and then power supplied by the HDMI source device 10A becomes usable. The HDMI active optical cable 100 operates the signal processors 112 and 131 by using the power supplied by this HDMI source device 10A, and can appropriately transmit a high-definition video signal from the HDMI source device 10A to the HDMI sink device 20.

On the other hand, when, for example, the source side plug 110 is connected to the external power supply, i.e., when the power supplied from the HDMI source device 10 is not used as a power supply for operating the signal processors 112 and 131, the user turns off the switch 114 provided on the source side plug 110. When the switch 114 is turned off, the projections 123 provided for the source side plug 110 are accommodated inside the housing 122. In this case, the HDMI active optical cable 100 is connectable to both of the power supply support HDMI source device 10A and power supply non-support HDMI source device 10B.

In addition, when the source side plug 110 is attached to the receptacle 13 of the HDMI source device 10A in a state where the switch 114 is turned off, the HDMI control section 113 of the source side plug 110 does not respond to the authentication request from the HDMI source device 10A. In this case, the HDMI source device 10A does not become in the state enabling supplying power, thereby eliminating unnecessary obtainment of power from the HDMI source device 10A.

As described above in detail using the specific examples, the HDMI active optical cable 100 according to the present embodiment is connectable to the power supply support HDMI source device 10A by turning on the switch 114 provided on the source side plug 110 and making the projections 123 protrude, but is not connectable to the power supply non-support HDMI source device 10B. Consequently, when the power supplied from the HDMI source device 10 is used, the HDMI active optical cable 100 is not connected to the power supply non-support HDMI source device 10B by mistake, so that it is possible to effectively prevent inconvenience of requesting more power than anticipated to the HDMI source device 10B, and causing an erroneous operation.

Furthermore, by turning off the switch 114 provided in the source side plug 110, and accommodating the projections 123 inside the housing 122, the HDMI active optical cable 100 according to the present embodiment is connectable to both of the power supply support HDMI source device 10A and the power supply non-support HDMI source device 10B. Consequently, when, for example, the source side plug 110 is connected to the external power supply, i.e., when the power from the HDMI source device 10 is not used, it becomes connectable not only to the power supply support HDMI source device 10A but also to the power supply non-support HDMI source device 108, thereby providing versatility.

Modification 1

In addition, the above embodiment has exemplified the projections 123 made of the insulation material such as the resin as the movable members which move in a coupled manner with the switch 114, but is not limited to this. For example, the movable members which move in a coupled manner with the switch 114 can alternatively be configured as new terminal differing from the above terminal 111. When, for example, power supply lines to which power supplied from the HDMI source device 10A flows can be provided in addition to the above +0.5V line, power reception terminals on the side of the source side plug 110 meeting these power supply lines can be used as the movable members which move in a coupled manner with the switch 114. In this case, when the source side plug 110 is attached to the receptacle 13 of the HDMI source device 10A in a state where the switch 114 is turned on and moves to the first position, the power reception terminals which are the movable members are connected to power feeding terminals on the side of the HDMI source device 10A. Consequently, the power supplied from the HDMI source device 10A can flow in the power supply lines, and can be used as a power supply for operating the signal processors 112 and 131.

Modification 2

Furthermore, the above embodiment is an example of application to the HDMI active optical cable 100 which uses the optical fiber as the channel. However, the embodiment is also applicable to an HDMI active cable which uses a copper wire as the channel. The HDMI active cable has a function of transmitting a video signal from the HDMI source device 10 as an electrical signal as is to the HDMI sink device 20, and correcting transmission-attributed attenuation of the electrical signal. More specifically, the signal processor 131 of the sink side plug 130 is configured as an equalizer which corrects the waveform of the electrical signal. In this case, when power supplied from the HDMI source device 10 is used as a power supply for operating the signal processor 131 (equalizer) of the sink side plug 130, the switch 114 is turned on.

Modification 3

Furthermore, the above embodiment is the example of application to the HDMI active optical cable 100 which transmits a video signal from the HDMI source device 10 to the HDMI sink device 20. However, the embodiment is also applicable to the HDMI source device 10 which is directly connected to the HDMI sink device 20, and the HDMI sink device 20 which is directly connected to the HDMI source device 10.

Figure 7:
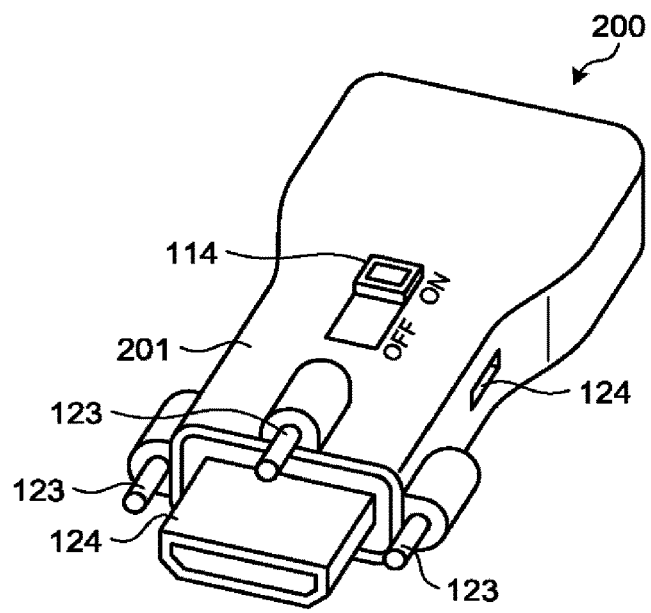
FIG. 7 is a diagram illustrating one example of an HDMI dongle according to Modifications.

When, for example, the HDMI source device 10 is configured as an HDMI dongle 200 as illustrated in FIG. 7, and receives a power supply from the external power supply or the HDMI sink device 20 and operates, this HDMI dongle 200 has a function equivalent to the source side plug 110 of the above HDMI active optical cable 100. That is, a housing 201 of the HDMI dongle 200 is provided with the switch 114 which is turned on when the HDMI dongle 200 receives power supplied from the HDMI sink device 20 and operates, and the projections 123 which move in a coupled manner with this switch 114. Furthermore, the power supply support HDMI sink device 20 for the HDMI dongle 200 is provided with the recess portions 16 which accommodate the projections 123 when the HDMI dongle 200 in a state where the switch 114 is turned on is attached to the receptacle 21. In addition, the power supply non-support HDMI sink device 20 is not provided with the recess portions 16.

The HDMI dongle 200 configured as described above is connectable to the power supply support HDMI sink device 20 in the state where the switch 114 is turned on, and is not connectable to the power supply non-support HDMI sink device 20. Consequently, similarly to the above embodiment, it is possible to effectively prevent the inconvenience that the HDMI dongle 200 is connected to the power supply non-support HDMI sink device 20 by mistake, and causing an erroneous operation of the HDMI sink device 20.

Figure 8:
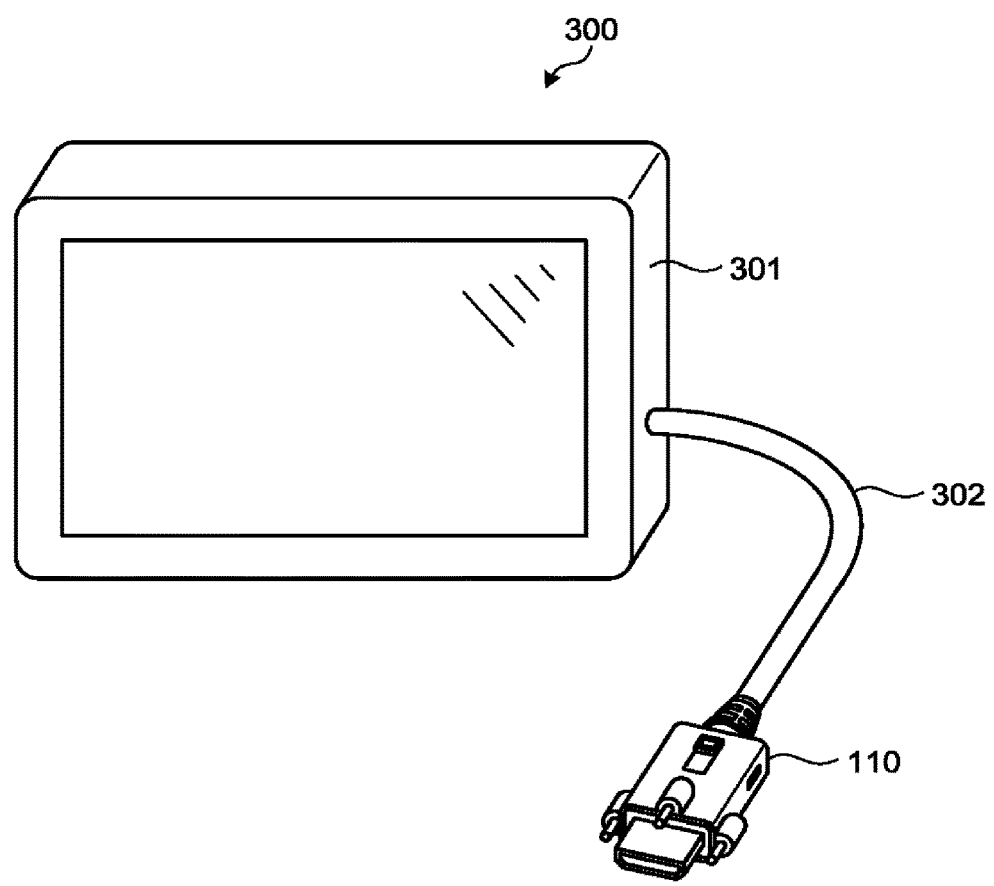
FIG. 8 is a diagram illustrating one example of a portable display according to the Modification.

Furthermore, when the HDMI sink device 20 is configured as a portable display 300 which includes a display main body 301, and a connection cable 302 which connects the display main body 301 with the HDMI sink device 20 as illustrated in, for example, FIG. 8, and receives power supplied from the external power supply or the HDMI sink device 20 and operates, a connector of an end portion of the connection cable 302 employs substantially the same configuration as that of the source side plug 110 of the above HDMI active optical cable 100. Furthermore, the portable display 300 is connectable to the power supply support HDMI source device 10, in the state where the switch 114 is turned on, and is not connectable to the power supply non-support HDMI source device 10B. Consequently, similarly to the above embodiment, it is possible to effectively prevent inconvenience that the portable display 300 is connected to the power supply non-support HDMI source device 108 by mistake, thereby causing an erroneous operation of the HDMI source device 10B.

Modification 4

Furthermore, the above embodiment has exemplified the HDMI as a video signal interface, but is not limited to this. Even when, for example, interfaces such as DisplayPort (registered trademark), Mobile High-Definition Link (MHL) (registered trademark), HD BaseT (registered trademark), VbyOne (registered trademark), and Thunderbolt (registered trademark) other than the HDMI are used, the embodiment is effectively applicable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connector device connected to an electronic device, the connector device comprising:
   a signal processor that processes a signal inputted from the electronic device or a signal outputted to the electronic device;
   a switch that is turned on when power supplied from the electronic device is used as a power supply for operating the signal processor; and
   a movable member that moves to a first position when the switch is turned on, and moves to a second position when the switch is turned off, wherein
   the connector device is connectable to a power supply support electronic device and is not connectable to a power supply non-support electronic device when the movable member is at the first position,
   the connector device is connectable to either one of the power supply support electronic device and the power supply non-support electronic device when the movable member is at the second position, and the connector device further comprises a control section that responds to an authentication request from the electronic device when the connector device is connected to the power supply support electronic device in a state that the switch is on, and does not respond to the authentication request from the electronic device when the connector device is connected to the power supply support electronic device in a state that the switch is off.

2. The connector device according to claim 1, wherein the signal processor converts an electrical signal inputted from the electronic device into an optical signal.

3. The connector device according to claim 1, wherein the movable member is a power reception terminal that is connected to a power feeding terminal of the power supply support electronic device when the movable member is at the first position.

4. A transmission cable comprising:
the connector device according to claim 1; and
a channel through which the signal processed by the signal processor is transmitted.

* * * * *